United States Patent
Hayashi et al.

(10) Patent No.: US 6,952,404 B2
(45) Date of Patent: Oct. 4, 2005

(54) COMMUNICATION SYSTEM AND COMMUNICATION CONTROL METHOD

(75) Inventors: Shunsuke Hayashi, Tokyo (JP); Hideo Matsukawa, Tokyo (JP); Toyoaki Yokoi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 428 days.

(21) Appl. No.: 10/287,766

(22) Filed: Nov. 4, 2002

(65) Prior Publication Data

US 2003/0081541 A1 May 1, 2003

Related U.S. Application Data

(62) Division of application No. 09/255,427, filed on Feb. 22, 1999, now Pat. No. 6,556,583.

(30) Foreign Application Priority Data

Feb. 24, 1998 (JP) .............................................. 10-42347
Feb. 25, 1998 (JP) .............................................. 10-43132
Feb. 27, 1998 (JP) .............................................. 10-47309
Feb. 27, 1998 (JP) .............................................. 10-47310

(51) Int. Cl.$^7$ .............................................. G06F 11/00
(52) U.S. Cl. ...................... 370/242; 370/248; 370/225; 714/4
(58) Field of Search .............................. 370/216–228; 714/1, 4, 748; 340/825.01

(56) References Cited

U.S. PATENT DOCUMENTS 4,304,001 A * 12/1981 Cope .............................. 714/4

* cited by examiner

*Primary Examiner*—Steven Nguyen
(74) *Attorney, Agent, or Firm*—Moonray Kojma

(57) ABSTRACT

A communication control system and method comprising, in one embodiment, a master station connected to a slave station using two redundant buses, wherein command frames having the same content are sent out to the buses and the communication process is changed depending on whether or not the contents of the command frames, when received by the receiving station, are identical.

6 Claims, 14 Drawing Sheets

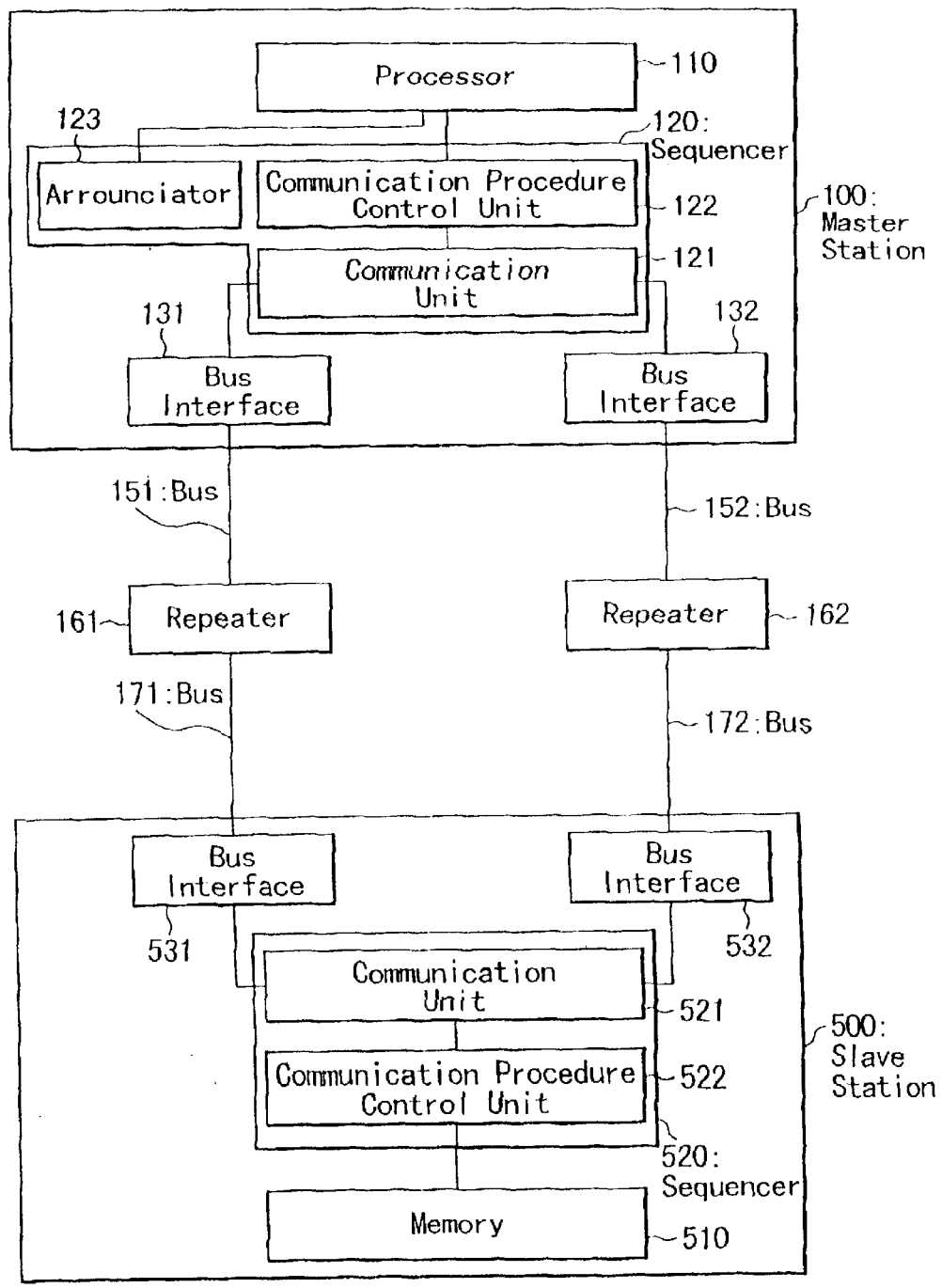

FIG. 8

| Presence/Absence of Errors | Consistency of Received Information | Action Taken by the Communication Procedure Control Unit |
|---|---|---|
| Bus 41: Normal<br>Bus 42: Normal | Match | Acts as dictated by the command and returns a normal-end response to both buses. |
| Bus 41: Normal<br>Bus 42: Error Detected | Don't Care | Acts as dictated by the command and returns a normal-end response to Bus 41 only. |
| Bus 41: Error Detected<br>Bus 42: Normal | Don't Care | Acts as dictated by the command and returns a normal-end response to Bus 42 only. |
| Bus 41: Normal<br>Bus 42: Normal | Mismatch | Ignores the command and returns an abnormal-end response to both buses. |
| Bus 41: Error Detected<br>Bus 42: Error Detected | Don't Care | Ignores the command and does not return any response to either bus. |

FIG. 9A

| Presence/Absence of Errors | Consistency of Received Information | Action Taken by the Communication Procedure Control Unit |
|---|---|---|
| Bus 21: Normal<br>Bus 22: Normal | Match<br>(Normal-end response) | Informs the processor of the normal end of access.<br>Status flag [Normal;Normal;Match] |
| Bus 21: Normal<br>Bus 22: Error Detected | Don't Care<br>(Normal-end response to Bus 21) | Informs the processor of the normal end of access.<br>Status flag [Normal;Error Detected; Don't Care] |
| Bus 21: Error Detected<br>Bus 22: Normal | Don't Care<br>(Normal-end response to Bus 22) | Informs the processor of the normal end of access.<br>Status flag [Error Detected;Normal; Don't Care] |
| Bus 21: Normal<br>Bus 22: Normal | Mismatch | Informs the processor of the abnormal end of access.<br>Status flag [Normal;Normal; Don't Care] |

FIG. 9B

| | | |
|---|---|---|
| Bus 21: Normal<br>Bus 22: Normal | Match<br>(Abnormal-end responses to both of the buses) | Informs the processor of the normal end of access. |
| Bus 21: Normal<br>Bus 22: Not Checked | Don't Care<br>(Abnormal-end response to Bus 21) | Informs the processor of the abnormal end of access.<br>Status flag [Normal; Not Checked; Don't Care] |
| Bus 21: Not Checked<br>Bus 22: Normal | Don't Care<br>(Abnormal-end response to Bus 22) | Informs the processor of the abnormal end of access.<br>Status flag [Not Checked; Normal; Don't Care] |
| Bus 21: Not Checked<br>Bus 22: Not Checked | Don't Care<br>(No response to either bus) | Informs the processor of the abnormal end of access.<br>Status flag [Not Checked; Not Checked; Don't Care] |

| D3-0 | DATA 5-0 |
|---|---|
| 0000 | 111000 |
| 0001 | 011100 |
| 0010 | 011001 |
| 0011 | 010011 |
| 0100 | 000111 |
| 0101 | 001011 |
| 0110 | 001101 |
| 0111 | 001110 |
| 1000 | 010110 |
| 1001 | 010101 |
| 1010 | 110100 |
| 1011 | 110010 |
| 1100 | 100011 |
| 1101 | 100110 |
| 1110 | 101100 |
| 1111 | 101001 |

COMMUNICATION SYSTEM AND COMMUNICATION CONTROL METHOD this is a Divisional of application Ser. No. 09/255,427, filed Feb. 22, 1999, now U.S. Pat. No. 6,556,583.

BACKGROUND OF THE INVENTION

1. Field of Invention

This invention relates to a communication system and a communication control method, wherein stations are connected to buses and communicate with each other through the buses.

2. Description of the Prior Art

A computing system is typically divided into CPU (central processing unit) sections, storage unit sections, input/output interface sections, etc, and a plurality of printed wire boards comprising the sections are installed in such system. The printed wire boards are interconnected by connecting connectors attached to the boards through a bus. A board provided with connectors and a bus is generally called a backplane. A communication system is built using a backplane to enable printed wire boards in the system to communicate with each other. The prior art and its problems found in a communication system where backplanes are adopted, are as follows:

In a communication system comprising a master station and a slave station with a bus interconnecting the stations is often duplicated in order to increase communication reliability. In such a dual redundant bus system, two redundant buses are used alternately as long as both buses are in normal condition. If one of the buses should fail, the other normal bus is used to continue communication. Meanwhile, concurrent communication is carried out in order to check periodically whether or not the failed bus has recovered.

Another problem is that the master-slave communication does not take place unless a processor in the master station is aware of the status of the redundant buses. More specifically, the processor must be aware of which of the two redundant buses is the active bus or the standby bus.

A further problem is that control must be carried out to switch from one bus to the other bus when either of the buses fails. A further problem is that the integrity of the transferred data is checked by adding check bits to the data. Although this checking procedure using check bits can examine the integrity of the data on the bus, it cannot examine the integrity of the data in areas other than the bus, such as bus interfaces, bridges, and repeaters.

Also, in communication systems, there are various reasons why the waveform of a bus signal may become distorted, as described below. FIG. 1 shows a conventional communication system wherein a plurality of units 21 to 2n are connected to a bus 1 in a multidrop configuration. Units 21 to 2n communicate with each other through bus 1. FIG. 2 shows an equivalent circuit of bus 1, wherein bus 1 has its own inductance L and stray capacitance C. When any of the units 21–2n is connected to bus 1, the circuit impedance decreases because of the capacitance component C of the unit itself. Accordingly, a signal transferred through bus 1 to the unit 21 ... 2n is reflected back to points where other units 21 ... 2n are connected. For example, if a signal is sent from unit 21 to unit 22 in FIG. 1, reflected signals occur at the connection points of units 22 to 2n to bus 1.

FIG. 3 shows the waveform of a signal at point B of FIG. 1. Signal reflected by units 23 to 2n reach point B before the signal received by unit 22 changes from a high level state to a low level state. As a result, the reflected signals from units 23 to 2n are superposed with the received signal, as shown in FIG. 3, thus increasing the degree of waveform distortion. This may cause receiving unit 22 to malfunction. In the example of FIG. 3, the magnitude of the superposed reflected signals exceeds the low level threshold.

In order to avoid this problem, the following restrictions are applied. in the prior art: (A) Special devices having low capacitances are used with the units. (B) The number of connected units is reduced. It is desired to control the effects of such reflected signals without being limited by these prior art restrictions.

The waveform of a bus signal may also become distorted in the following manner. In a communication system, the transmitter circuit of a unit is provided with a driver IC (integrated circuit) that sends out signals to a bus. If any one bit, among a plurality of bits inputted to the driver IC, is kept static and all of the other bits are switched at the same time, the ground potential of the driver IC increases. This phenomenon is known as "ground bounce", and noise may be induced at the static bit due to the effects of "ground bounce". This noise is also known as "simultaneous switching noise", and faulty data may be transferred due to the "simultaneous switching noise". Once the "ground bounce" occurs, it takes some time for the ground potential to return to zero. This results in a disadvantageous increase in the communication delay time. It is desirable to reduce the effects of "ground bounce" which plagues prior art systems and methods.

FIG. 4 shows a standard communication system which has another problem. In FIG. 4, a transmitter circuit 11 and a receiver circuit 12 are connected to a transmission line 10 which constitutes a bus. Data is transferred from transmitter circuit 11 to receiver circuit 12 through transmission line 10. Transmitter circuit 11 and receiver circuit 12 operate on asynchronous clocks having different phases. Before any signal transfer can be carried out in the communication system, data transmitted using the clock in the transmitter circuit must be somehow synchronized with the clock in the receiver circuit. There are certain difficulties existing as a result.

If data needs to be transferred using start stop synchronization that transmits data only, this synchronization is achieved only by using a clock which is faster than the data transfer rate for the receiver to sample the data. Normally, a high speed clock having a frequency which is approximately 16 times the data transfer rate is used.

On the other hand, if data needs to be transferred using clock synchronization that sends data together with a clock signal, this synchronization is achieved by writing the data once into a FIFO circuit in the receiver circuit using the transmitted clock signal, and then reading the data from the FIFO circuit using the clock in the receiver circuit.

Disadvantageously, data transfer based on start stop synchronization requires that the receiver circuit be provided with a clock that operates at speeds higher than the data transmission rate. As a result data transmission rate must be lower than the frequency of the clock available for the receiver circuit. For this reason, in the prior art, high speed signal transfer has been difficult to achieve.

Also, disadvantageously, data transfer based on clock synchronization requires that the data be written once into a FIFO circuit in the receiver circuit using the transmitted clock signal. For this reason, faulty data may be written into the FIFO circuit if the waveform of a received clock signal is distorted. The waveform of signals that propagate between circuits connected to the transmission line or bus are distorted due to the capacitive load of the transmission line or due to the effects of the noise that enters the transmission line. Thus, in the prior art, it is difficult to achieve high speed, consistent signal transfer.

Moreover, in the art, where two or more bus masters share the same system resources, such as storage units, through a common bus, concurrent or simultaneous requests from the respective bus masters to use the same bus cause conflicting demands. If this happens, some method of control must be used to decide which bus master should get first use of the bus. Bus arbitration is carried out for this purpose.

FIG. 5 shows a conventional communication system, wherein bus masters 31 to 3n are connected to a data bus 42 and an arbitration bus 43. A slave 44 is, for example, a storage unit and is connected to the data bus 42. An arbiter 45 is incorporated in each of the bus masters 31 to 3n. The arbiter 45, after having executed arbitration procedure using arbitration bus 43, permits the bus master that has acquired the right to use data bus 42 to do so. The bus master that has acquired the right to use the data bus 42 gains access to slave 44.

FIG. 6 shows operation of the embodiment of FIG. 5, wherein bus masters 31 and 32 acquire the right to use data bus 42 in succession in the order of the bus master 31, then bus master 32, and the bus master 31. In this process, an arbitration procedure using arbitration bus 43 takes place each time the right to use is acquired. However, when a bus master then has acquired the right to first use of bus 42 wants to again use the data bus 42 in succession, the arbitration action takes place even if no other bus master requests use of the data bus 42. In the example of FIG. 6, where bus master 32 uses the data bus 42 in two consecutive rounds, the arbitration action takes place each time the bus master acquires the right of use.

This prior method of arbitration involves a waste of time and leads to the problem of performance degradation. The amount of wasted time increases especially when one particular bus master alone uses the data bus more often than the other bus masters.

Thus, as described above, the prior art has many problems and defects which need improvement.

SUMMARY OF THE INVENTION

Accordingly, an object of the invention is to overcome the aforementioned and other deficiencies, defects and problems of the prior art.

Further objects are to provide a communication system and control method, wherein communication can be carried out without being aware of the state of the dual redundant buses; wherein the integrity of the data in areas other than the bus can be readily examined; and wherein high speed, highly reliable communication are readily and easily achieved.

BRIEF DESCRIPTION OF THE DRAWINGS

FIG. 7 is a block diagram depicting an illustrative embodiment of the invention.

FIG. 8 is a schematic representation depicting operation of the communication procedure control unit of the slave station of FIG. 7.

FIGS. 9A and 9B are other schematic representations depicting operations of the communication procedure control unit of the master station of FIG. 7.

DETAILED DESCRIPTION OF THE PREFERRED EMBODIMENTS

Illustrative Embodiment No. 1

Figure 1:
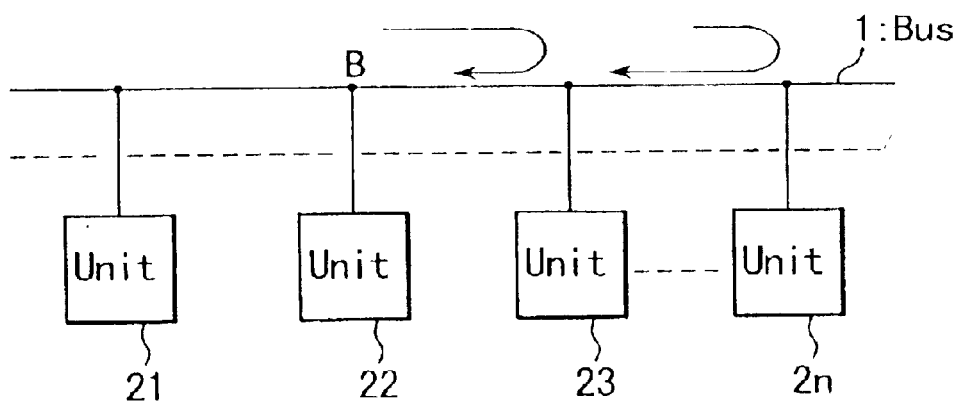
FIG. 1 is a schematic diagram depicting an example of a conventional communication system.
Figure 2:
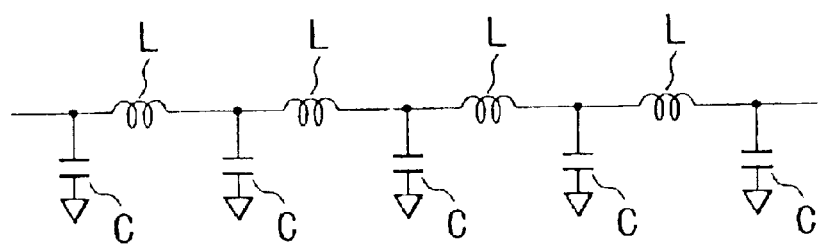
FIG. 2 is an equivalent circuit diagram depicting the bus shown in FIG. 1.
Figure 3:
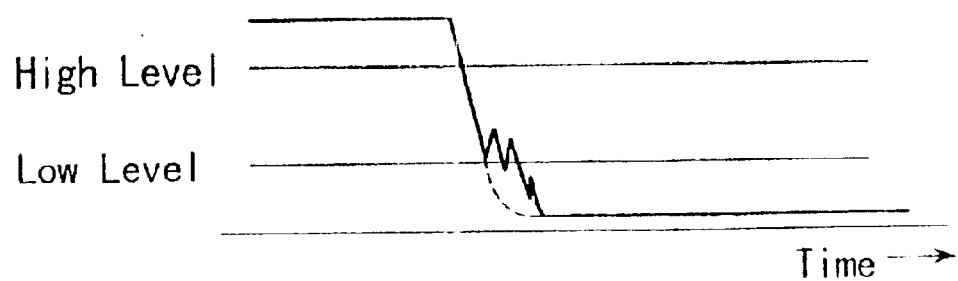
FIG. 3 is a waveform diagram depicting signals observed at point B in FIG. 1.
Figure 4:
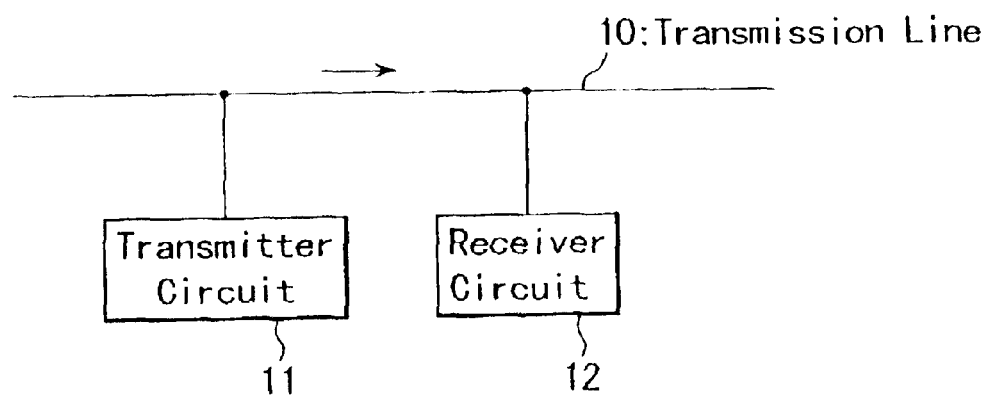
FIG. 4 is a schematic diagram depicting a standard communication system.
Figure 5:
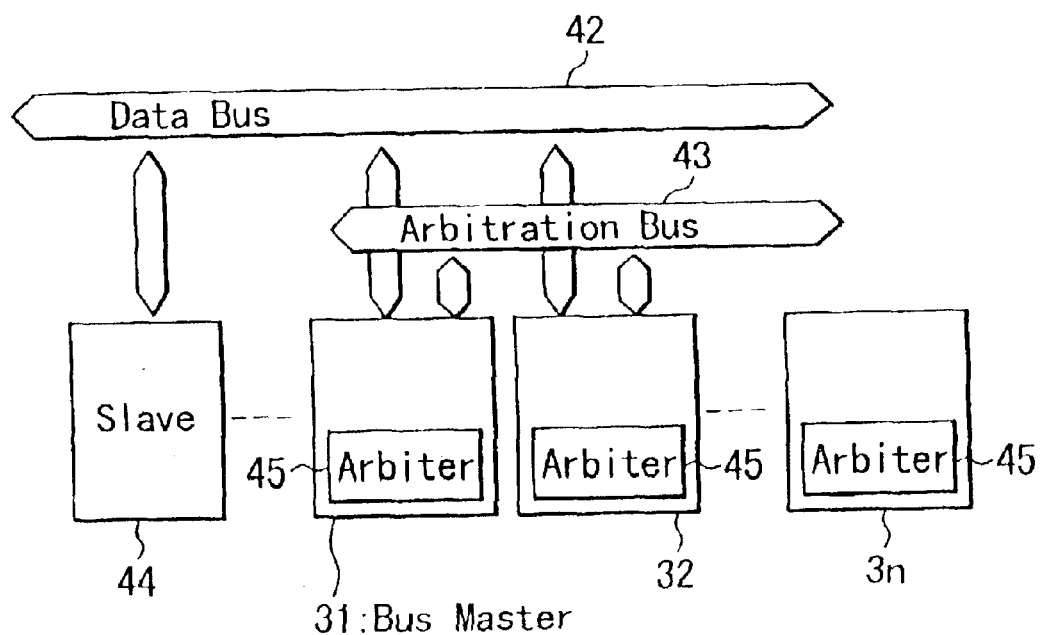
FIG. 5 is a schematic diagram depicting a conventional communication system.
Figure 6:
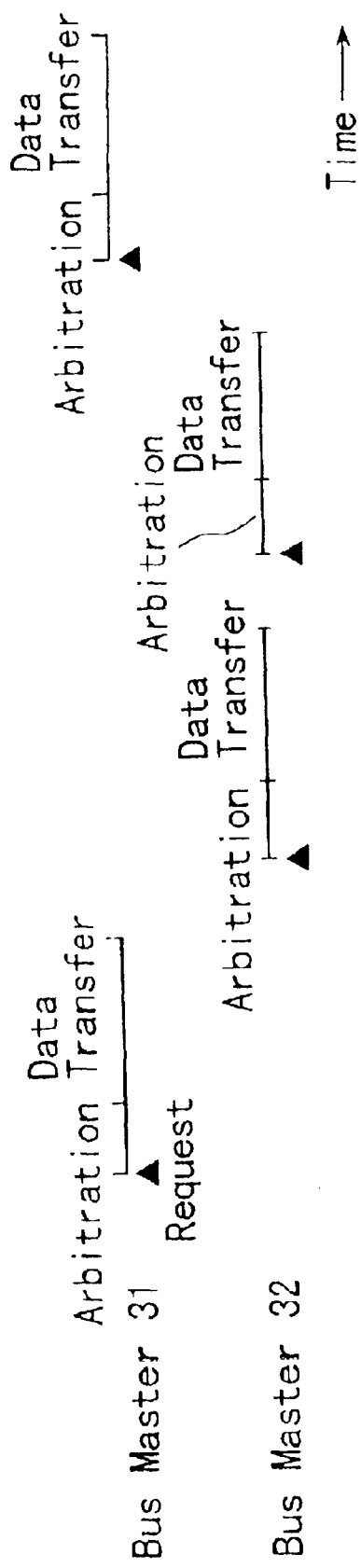
FIG. 6 is a schematic diagram depicting operation of the system of FIG. 5.

FIG. 7 shows a communication system embodying the principles of the invention, and comprises two redundant buses 151 and 152 connected to a master station 100 and through relay equipment 161 and 162 to two redundant buses 171 and 172, with buses 171 and 172 being connected to slave station 500. The relay equipment 161,162, for example, may be bridges or repeaters. The relay equipment 161,162 may be excluded from this embodiment, as desired. In this case, buses 151 and 152 would be identical to the buses 171 and 172.

Master station 100 comprises a processor 110 which controls the master station 100 as a whole. A sequencer 120 is connected to buses 151 and 152 through bus interfaces 131 and 132. Sequencer 120 is provided with a communication unit 121, a communication procedure control unit 122 and an annunciator 123, the operations of which are described hereinbelow.

Slave station 500 comprises a subordinate unit 510 which is a device that operates under the command and control of master station 100 and is a memory in the example shown in FIG. 7. A sequencer 520 is connected to buses 171 and 172 through bus interfaces 531 and 532. The sequencer 520 is provided with a communication unit 521 and a communication procedure control unit 522, the operations of which are described hereinbelow.

The operation of the communication control system of FIG. 7 is as follows. The communication unit 121, in sequencer 120, simultaneously sends out two command frames having the same content to buses 151 and 152. The command frames contain added test bits. The transmitted command frames travel through buses 151 and 152, relay equipment 161 and 162, then buses 171 and 172 to reach slave station 500. At slave station 500, communication unit 521 receives the command frames. Then, the communication procedure control unit 522 processes the received command frames.

FIG. 8 is a diagram showing operation of the communication procedure control unit 522 of the slave station 500, which unit 522 performs a test of valid data transfer using check bits on the contents of the two command frames that slave station 500 receives through buses 171 and 172, and examines whether or not the contents of the received two command frames match. The communication procedure control unit 522 then executes the processes described below depending on the results of the test and examination. The received contents are check for errors by, for example, means of a cyclic redundancy check (called "CRC").

(1) If the command frames, which are judged to be normal by means of the check bits, are received through both buses 171,172 and the contents of the two received command frames match, the communication procedure control unit 522 acts as dictated by the command and returns normal end responses having the same content to both buses.

(2) If the command frame, which is. judged to be normal by means of the check bits, is received through either bus 171 or 172, the communication procedure control unit 522 acts as dictated by the command and returns a normal end response to only the bus that received the command frame.

(3) If the command frames, which are judged to be normal by means fo the check bits, are received through both buses but the contents of the received two command frames do not match, the communication procedure control unit 522 ignores the contents of the commands and returns abnormal end responses having the same contents to both buses 171,172.

(4) If the command frame, which is judged to be normal by means of the check bits, is not received through either of the buses 171,172, the communication procedure control unit 522 does not return any response to either of the buses 171,172.

In the foregoing processes, the "command frames which are judged to be normal by means of the check bits, are received" means that the command frames are received and the results of examination using the check bits are normal.

Meanwhile, communication unit 521 sends out response frames received from the communication procedure control unit 522 to the buses 171,172. The communication unit 521 adds check bits to the response frames before sending the frames out. At the master station 100, the communication procedure control unit 122 monitors for response from the slave station 500.

FIG. 9 shows operation of the communication procedure control unit 122 of the master station 100. The communication procedure control unit 122 monitors for responses from slave station 500 and executes the processes listed below depending on the results of the monitoring.

(1) If the response frames, which are judged to be normal by means of the check bits, are received through both buses 151,152 and if they are normal end responses whose contents match, the communication procedure control unit 122 informs the processor 110 of the normal end of access.

(2) If the process frame, which is judged to be normal by means of the check bits, is received through either bus 151, or 152, and if it is a normal end response, the communication procedure control unit 122 informs the processor 110 of the norml end of access.

(3) If the response frames, which are judged to be normal by meas of the check bits, are received through both buses 151,152 but the contents of the received response frames do not match; or if the response frames, which are judged to be normal by means of the check bits, are received through both buses 151,152, and if the response frames are abnormal end responses whose contents match; or if a response frame, which is judged to be normal by means of the check bits, is received through either bus 151 or 152, and if it is an abnormal end response, then the communication procedure control unit 122 informs the processor 110 of the abnormal end of access.

(4) If a response frame, judged to be normal by means of the check bits, is not received through either of the buses 151,152, the communication procedure control unit 122 informs the processor 110 of the abnormal end of access.

The annunciator 123 informs processor 110 which of the above processes (1) . . . (4), the access to the slave station is provided before the process ended.

The communication procedure control unit 122 sets a status flag indicates the "state of the bus 171, state of the bus 172, and the conformity of received contents". The processor 110 checks the status flag when it diagnoses the states of the buses 151,152.

The embodiment of FIG. 7 provides many advantages. For example, it is possible to separate data exchange from control of a dual redundnat bus. As a result, data exchange can be carried out between the master station and slave station without requiring the processor in the master station to be aware of the state of the dual redundant buses during normal access. Another example is in the case where the frames are received through both buses at either the master station or the slave station and both frames prove to be normal by examination using check bits, the frames are judged to be abnormal if their contents do not match. This method of examination makes it possible to check the integrity of the received contents of the frames at functional components such as at bus interfaces and bridges, where errors could not usually be detected using check bits.

Illustrative Embodiment No. 2

Figure 10:
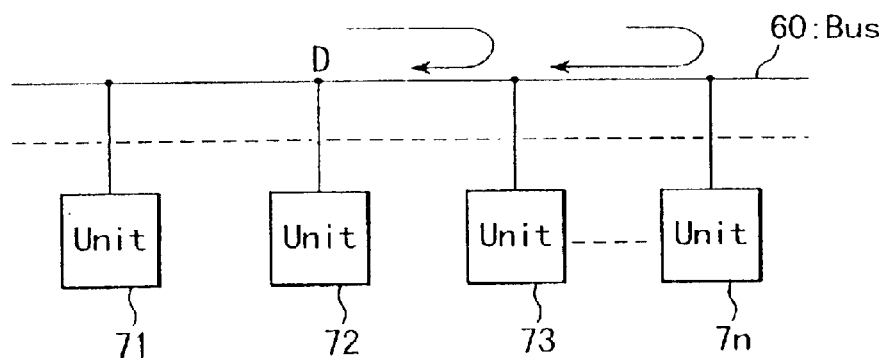
FIG. 10 is a diagram depicting another illustrative embodiment of the invention.

In FIG. 10, a plurality of units 71 . . . 7n are connected to a bus 60 in a multidrop configuration. The line length of bus 60 satisfies the following conditional formula:

(Transition Time of Transmission Signal on Bus 60)≦(Time Required for Transmission Signal to Make Round Trip Between Two Units with Shortest Path)

One example of bus 60 is a backplane bus. In FIG. 10, if a signal is sent from unit 71 to unit 72, for example, reflected signals are produced at the connections of the units 72 . . . 7n.

Figure 11:
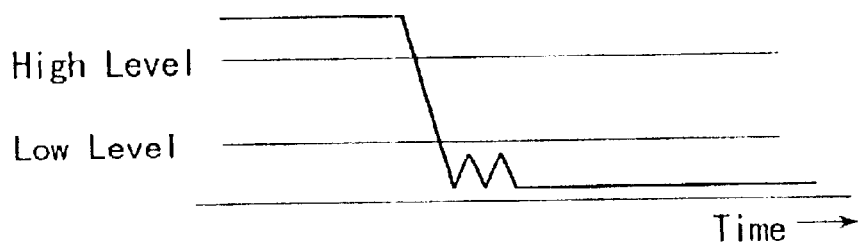
FIG. 11 is a waveform diagram depicting a signal observed at point D of FIG. 10.

FIG. 11 shows the waveform observed at point D of FIG. 10. At point D, the signal received by unit 72 changes from a high level state to a low level state before signals reflected by the other units 73 . . . 7n reach point D. As a result, as shown in FIG. 11, the signals reflected by units 73.7n never coincide with the transition of the signal received by unit 72 and are independent of each other. This means that the magnitude of superposed reflected signals never crosses the threshold of the low level state. Thus, the receiving unit 72 never malfunctions.

Figure 12:
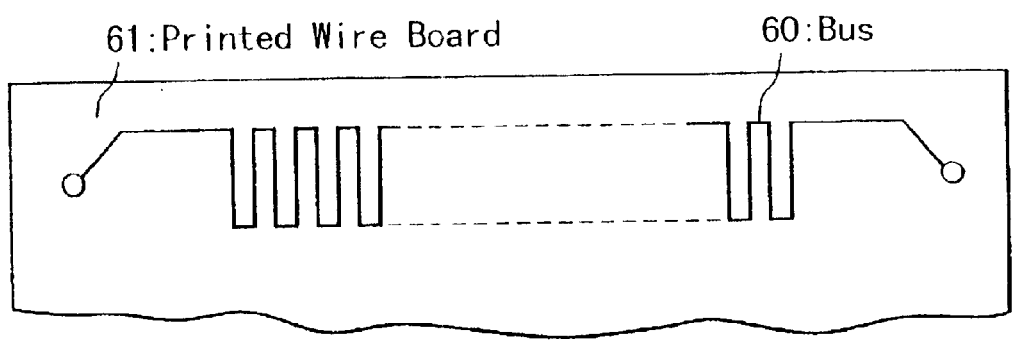
FIG. 12 is a diagram depicting an example of the bus of FIG. 10.

FIG. 12 shows an example of bus 60 of FIG. 10, wherein bus 60 is structured in a zigzag wiring pattern on a printed circuit board 61. In accordance with the invention, the line length of bus 60 is established so that the transition time of a transmission signal on the bus 60 is shorter than the time required for the transmission signal to make a round trip between any two of the units 71 . . . 7n. As a result, the transition time of a signal at any receiving unit passes before signals reflected by other units reach the receiving unit. The reflected signals are independent of each other, thus preventing the receiving unit from malfunctioning. This suppresses the effects of any reflected signal occuring on the bus 60. Also, since bus 60 may be advantageously structured in a zigzag wiring pattern on a printed wiring board as shown in FIG. 12, the overall line length of the bus can be increased effectively using the narrow space of the board.

Illustrative Embodiment No. 3

Figure 13:
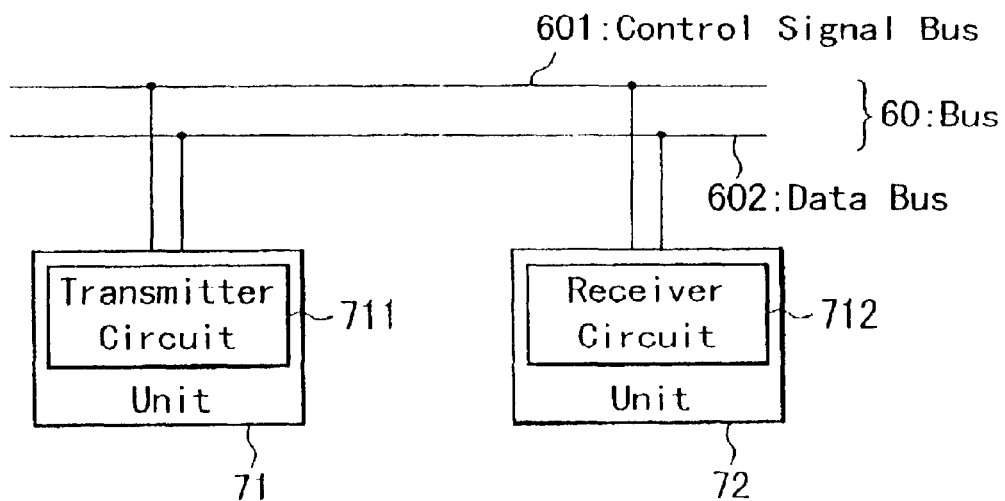
FIG. 13 is a diagram depicting a further embodiment of the invention.

FIG. 13 shows a bus 60 comprising a control signal bus 601 and a data bus 602 interconnecting a unit 71 provided with a transmitter circuit 711 and a unit 72 provided with a receiver circuit 721. Both transmitter circuit 711 and receiver circuit 721 may be incorporated in a single unit.

Figure 14:
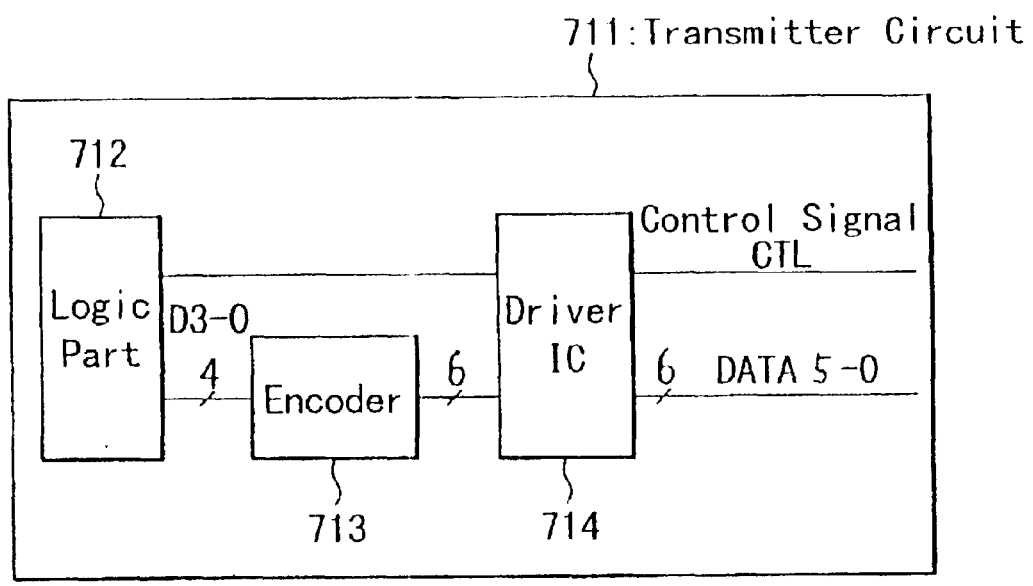
FIG. 14 is a diagram depicting an example of the transmitter circuit of FIG. 13.

FIG. 14 shows transmitter circuit 711 comprising a logic part 712 which outputs control signal CTL and data D3-0. These bit signals, for example, are data D3-0 as a 4-bit data. The transmitter circuit 711 comprises an encoder 713 which encodes data sent by logic part 712 into a bit signal having a fixed number of bits 1's. For example, data D3-0, which is a 4-bit data, may be encoded into DATA4-0 which is a 6-bit data.

Figures 15, 16:
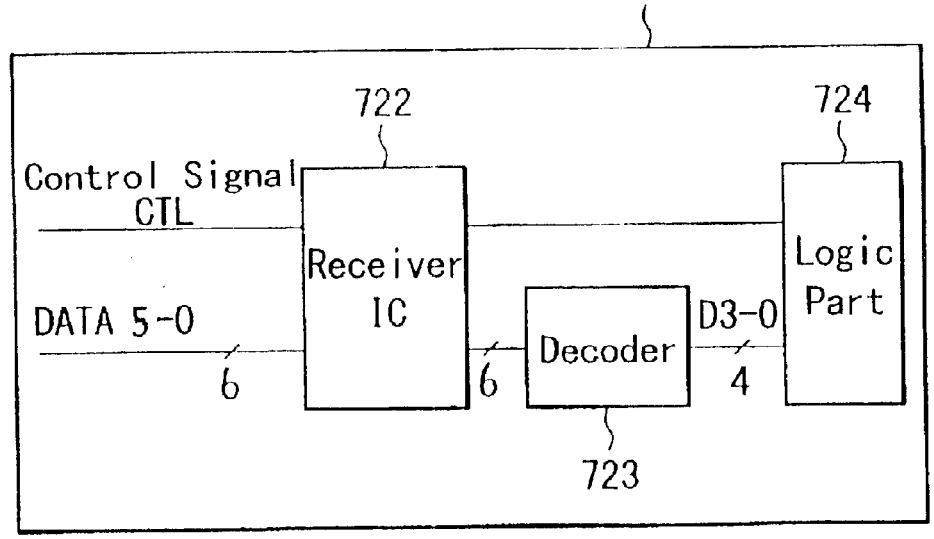
FIG. 15 is a conversion table used for coding.
FIG. 16 is a diagram depicting an example of the receiver circuit of FIG. 13.

FIG. 16 shows a code conversion table. Encoder 713 encodes data D3-0 into data DATA4-0 according to this table. Data DATA4-0 contains bit 1's whose quantity is fixed at either two or three. Returning to FIG. 14, the transmitter circuit 711 further comprises a driver IC 714 which outputs control signal CTL and data DATA4-0 to a bus 60. The number of bit 1's contained in data DATA4-0 supplied to driver IC 714 remains fixed at either two or three even when the states of the bits in data D3-0 changes simultaneously while the states of the bits in the control signal CTL are kept static. As a result, the effects of "ground bounce" are suppressed and the static bits of the control signal CTL are protected against induced noise.

FIG. 16 shows an example of a receiver circuit 721 of FIG. 13, comprising a receiver circuit 722 which receives control signal CTL and data DATA4-0 sent through bus 60. The receiver circuit 721 further comprises a decoder 723 which decodes data DATA4-0 back into data D3-0. AS a result, data transmitted by transmitter circuit 711 is restored. The receiver circuit 721 further comprises a logic part 724 which processes the control signal CTL and data D3-0.

The number of bits in data before and after coding and the number of bit 1's in data after coding may be other than those mentioned above. In the embodiment just discussed, transmission data is encoded into a bit signal having a fixed number of bit 1's before it is supplied to a driver IC. As a result, it is possible to reduce the effects of "ground bounce".

Illustrative Embodiment No. 4

Figure 17:
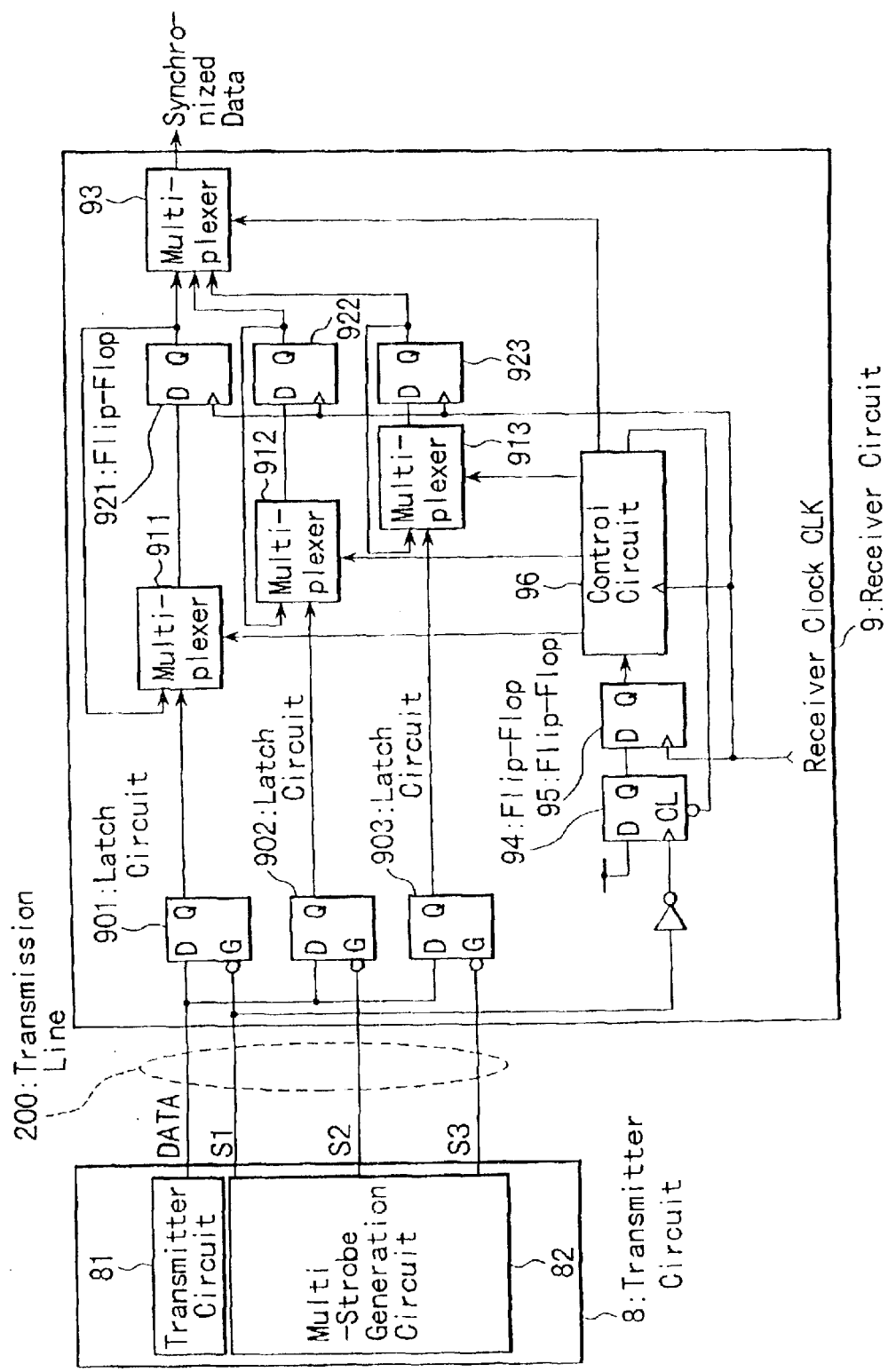
FIG. 17 is a diagram depicting a still further illustrative embodiment of the invention.

FIG. 17 shows another embodiment comprising a transmitter circuit 8 and a receiver circuit 9 interconnected by a transmission line 200. Only one transmitter circuit 8 and receiver circuit 9 are shown for sake of convenience of discussion. However, the number of each may be adjusted as desired.

The transmitter circuit 8 comprises a transmitter 81 which outputs data DATA to transmission lie 200; a multi-strobe generation circuit 82 whch generates as many as N strobe signals (wherein N is an integer) having different strobe timings onto a transmission line 200. In the example, the multi-strobe generating circuit generates three strobe signals, S1,S2 and S3.

The receiver circuit 9 comprises a number of latch circuits equal to the number of strobe signals, that is N latch circuits. In the example, three latch circuits are provided, 901,902, 903. Data sent by transmitter circuit 81 is successively retained in latch circuits 901,902,903, in that order, at the points in time of S1,S2 and S3, respectively. The outputs from the latch circuits 901,902,903 are supplied to multiplexers 911,912,913. The receiver circuit 9 further comprises flip-flop circuits 921,922,923 which are supplied with selected outputs from multiplexers 911,912, and 913, respectively, and at the same time feed the outputs thereof back to the multiplexers. Another multiplexer 93 selects one of the outputs from the flip-flop circuits 921,922 and 923 to output data, which serves as the synchronized data.

Flip-flop circuit 94 serves to detect the starting point of communication and is set as triggered by the rising edge of strobe signal S1. Flip-flop circuit 95 synchronizes the strobe signal S1 with the receiver clock CLK. Receiver clock CLK has a frequency which is equivalent to the transmission rate of data DATA. The receiver circuit 9 further comprises a control circuit 96 which receives the output from the flip-flop circuit 95 and receiver clock CLK to control the switching of the multiplexer 911, 912, 913 and 93 and to reset the flip-flop circuit 94 at the end of communication. The multiplexers 911,912, 913 and 93, the flip-flop circuits 921,922,923, 94 and 95, and the control circuit 96 constitute a sampling circuit that samples data retained in the latch circuits 901,902,903 using the receiver clock CLK, having a frequency which is equivalent to the transmission rate of data DATA, in order to synchronize the data with the receiver clock.

Figure 18:
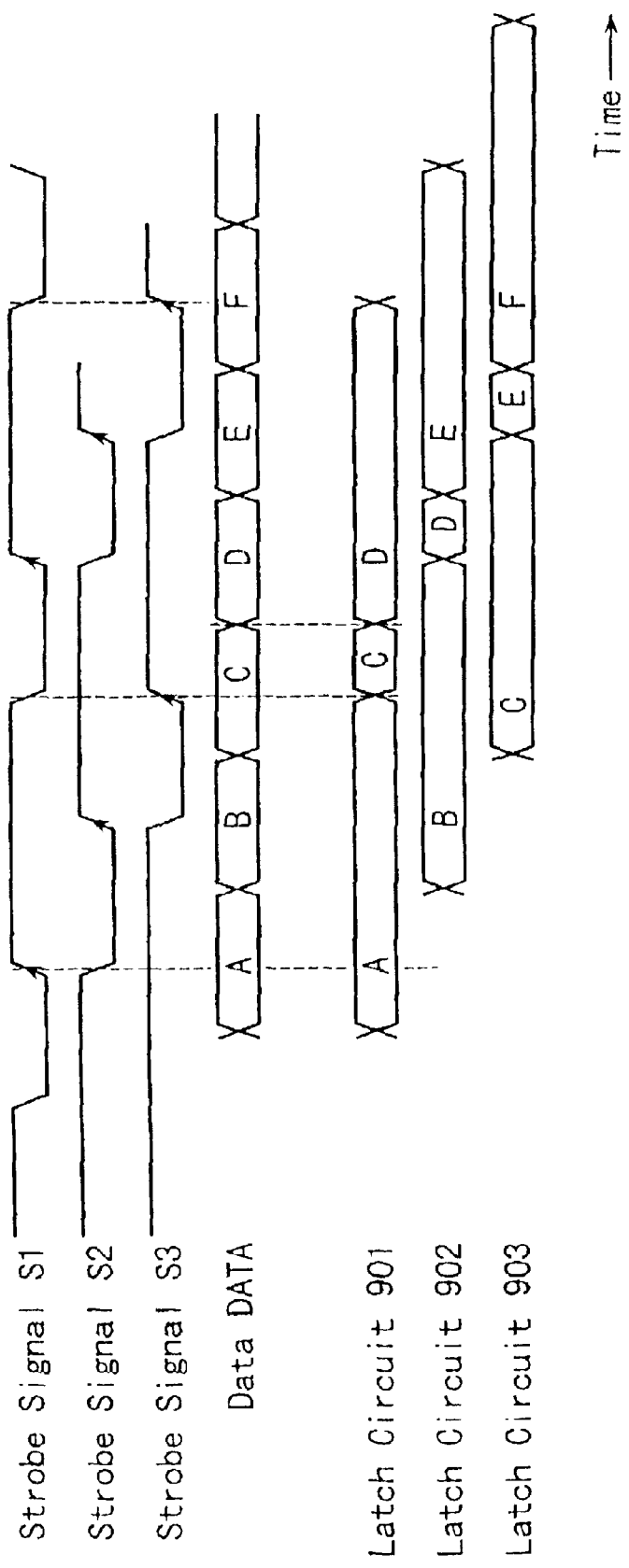
FIG. 18 is a timing chart depicting signals used in the embodiment of FIG. 17.

The operation of the embodiment of FIG. 17 is described with reference to FIG. 18 which is a signal timing chart. The embodiment utilizes three strobe signals S1,S2, and S3. The strobe signals are set at a high level when no communication is carried out. The moment when a strobe signal changes from a low level state to a high level state is the time data is strobed.

Transmitter circuit 8 drives data DATA and the three strobe signals S1,S2 and S3 to transmit data. In receiver circuit 9, latch circuits 901,902, and 903 retain data DATA during the strobe signals S1,S2 and S3, as shown. In the example of FIG. 18, data A, B and C retained in latch circuits 901,902 and 903. The latch circuits continue to hold the same data until the strobe signals make the next state transition. For example, latch circuit 901 retains data A and continues to hold data A until strobe signal S1 changes from a high level state to a low level state, as shown.

The sampling circuit as defined above samples data retained by latch circuits 901,902 and 1903 using receiver clock CLK, having a frequency which is equivalent to the data transmission rate of data DATA, to synchronize data with receiver clock CLK. Although receiver clock CLK is not synchronized with strobe signals S1,S2 and S3, the above synchronization can still be achieved by sampling the data retained in latch circuits 901,902,903 using receiver clock CLK before the data changes. For example, data A may be sampled using receiver clock CLK while latch circuit 901 retains the data. A frequency equivalent to the data transmission rate of data DATA is therefore enough for receiver clock CLK to achieve synchronization.

The embodiment of FIG. 17 attains the following advantages. For example, the transmitter circuit 8 only has to send data using N strobe signals in sequence, one by one. As a result, the transmitter circuit 8 can be implemented on virtually the same scale of integration as that of the conventional system, without the disadvantages of the prior art. Another example is that the receiver circuit 9 is provided with N latch circuits together with the N strobe signals thereby to retain data when activated by each of the strobe signals. Hence, data retained in any of the latch circuits remains unchanged until the strobe signal assigned to the latch circuit makes the next change of state, such as from high level state to low level state. As a result, the receiver clock used to sample data can be out of phase and asynchronous with the transmitted clock. Moreover, a frequency equivalent to the data transmission rate is sufficient for the receiver clock CLK. For this reason, the invention advantageously does not require a high speed clock such as used for data transmission based on a start stop synchronization wherein the clock must be faster thatn the data transmission rate. As a result, with the invention, it is not necessary to reduce the transmission rate below the frequency of the clock provided in the receiver circuit, so that high speed communication is provided in the invention.

A further advantage enjoyed by the embodiment is that the flip-flop circuits and control circuit for sampling in the receiver circuit are all designed to operate on the same receiver clock. That is, the receiver circuit does not have any FIFO circuit or control circuit that operate by using received strobe signals as their clock. Accordingly, the receiver circuit of the invention will not malfunction even if the strobe signal waveform becomes distorted due to the effects of a capacitive load or noise in the transmission line. Thus, consistent signal transfer is insured.

As just discussed, therefore, the invention realizes a high speed consistent signal transfer in a communication system.
Illustrative Embodiment No. 5

Figure 19:
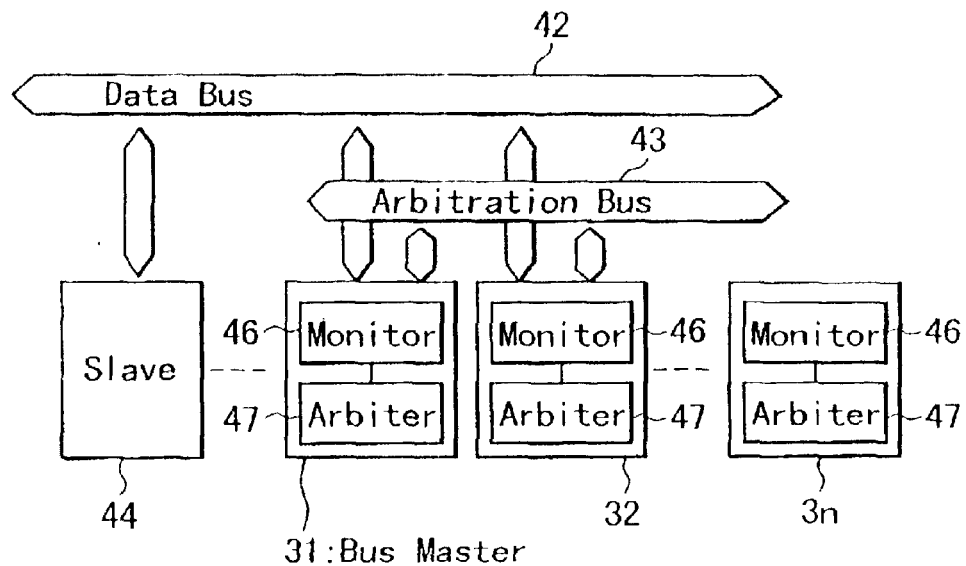
FIG. 19 is a diagram depicting a still further illustrative embodiment of the invention.

FIG. 19 shows an embodiment comprising bus masters 31 . . . 3n, each provided with a pair of monitor 46 and arbiter 47. Monitor 46 monitors signals on an arbitration bus 43. Once a request to use data bus 42 is issued from a bus master to which a particular arbiter 4 belongs, that arbiter 47 executes the following processes depending on the results of monitoring by monitor 46.

(1) If no arbitration is carried out on arbitration bus 43 after the bus master 31 to which the arbiter 47 belongs has finished using data bus 42, the arbiter 47 acquires the right to use data bus 42 without going through an arbitration procedure using arbitration bus 43.

(2) If arbitration is carried out on arbitration bus 43 after bus master 31 to which the arbiter 47 belongs has finished using data bus 42, the arbiter 47 acquires the right to use data bus 42 after having gone through the arbitration procedure using arbitration bus 43.

Figure 20:
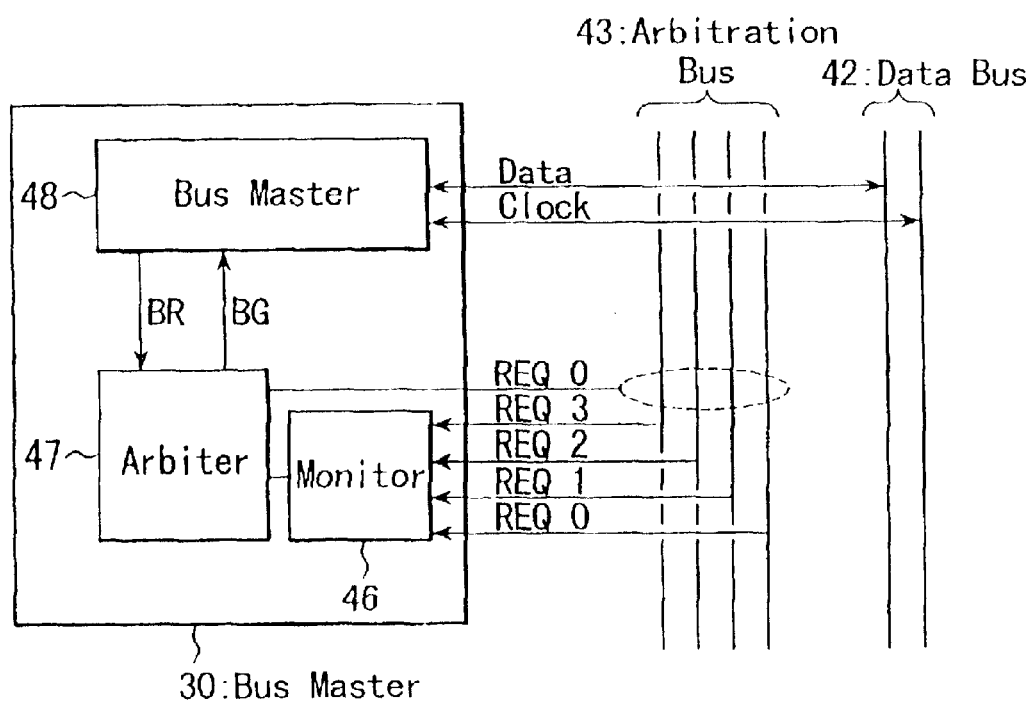
FIG. 20 is a diagram depicting a main part of the embodiment of FIG. 19.

FIG. 20 shows main parts of the embodiment of FIG. 19, wherein bus master 48 sends signal BR, requesting right to use bus 42 to an arbiter 47. When the bus master 48 receives signal BG, which informs of the right to use, it transmits data using data bus 42. The signal line of arbitration bus 43 carries signals REQ3 to REQ0, which represent a request for right to use the data bus by a bus master 30, as well as REQOUT (located above REQ3) signal. Signals REQ3 to REQ0 are input signals to bus master 30 and REQOUT signal is an output signal from bus master 30. Output REQOUT signal is supplied to the signal line of one of the signals REQ3 to REQ0. Signals REQ3 to REQ0 are prioritized in the order of REQ0, REQ1, REQ2 and REQ3. The number of signal lines need not be limited to the quantity mentioned above.

In this embodiment, arbitration is carried out according to the following procedure.

(A) Neutral State

If bus master 30 is in a neutral state, there is no request from that bus master 30 to use the bus 42. In this state, data bus 42 or output REQOUT signal is not driven from bus master 30.

(B) Transmission of Bus Request

If a request to use data bus 42 arises, bus master 30 makes its own REQOUT signal active without delay, after confirming that signals REQ3 to REQ0 on the arbitration bus are inactive.

(C) Wait for Bus Request Settlement

After sending out the REQOUT signal, bus master 30 compares each of signals REQ3 to REQ0 on the arbitration bus 43 with its own REQOUT signal to determine the order of priority, and the executes the following processes.

(1) If bus master 30 finds that there is a signal among REQ3 to REQ0 on arbitration bus 43 that has a higher priority than its own REQOUT signal, then it temporarily withdraws its own REQOUT signal and enters a wait state.

(2) If bus master 30 finds there is only the REQOUT signal which it originated on arbitration bus 43, then it measures the period over which that condition continues. As soon as the measured period reaches a specified value, bus master 30 acquires the right to use the data bus 42.

(3) If bus master 30 finds that there is a signal among REQ3 to REQ0 on arbitration bus 43 that has a lower priority than its own REQOUT signal, then it enters a wait state with its own REQOUT signal held active. Thus, bus master 30 waits until the signal having the lower priority disappears. As soon as the signal has disappeared, the bus master 30 returns to the condition described in paragraph (2) immediately above.

(D) Use of Bus

Once bus master 30 acquires the right to use data bus 42, bus master 48 transfers data using data bus 42. While data bus 42 is in use, bus master 30 continues outputting the REQOUT signal. When data bus 42 is no longer in use, bus master 30 releases data bus 42 and withdraws the REQOUT signal.

(E) Monitoring for Request to Use Data Bus

Subsequently, monitor 46 monitors signals REQ3 to REQ0 on arbtration bus 43. If another bus master 30 issues any of the signals REQ3 to REQ0, monitor 46 brings its own bus master 30 into a neutral state. In that case, monitor 46 forces its own bus master 30 to enter a neutral state even when one of the signals among REQ3 to REQ0 has a lower priority than that of the bus master 30's own REQOUT signal.

If the request to use bus 42 is issued from bus master 30 itself before any other bus master 30, bus master 30 uses bus 42 again.

(F) Reuse of the Data Bus

When reusing the data bus 42, bus master 30 activates the REQOUT signal to immediately acquire the right to use data bus 42. More specifically, bus master 30 immediately acquires the right without going through the arbitration procedure using the arbitration bus 43. This saves wasteful arbitration time. when bus master 30 finishes using data bus 42, it releases data bus 42 and then withdraws the REQOUT signal to monitor for request to use data bus 42. That is to say, bus master 30 moves to the condition described in just described paragraph (E).

Figure 21:
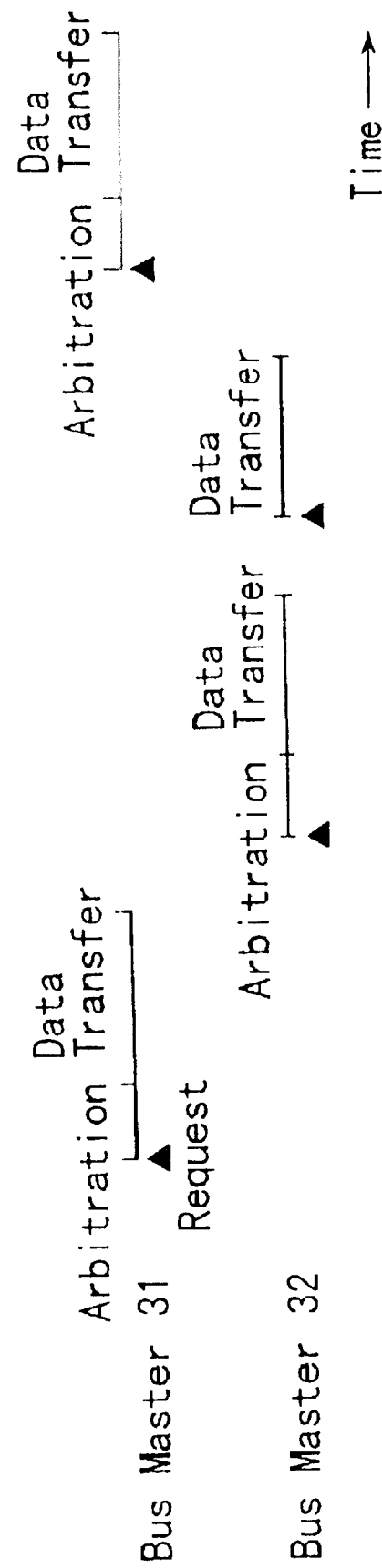
FIG. 21 is a diagram depicting operation of the embodiment of FIG. 19.

FIG. 21 shows operation of the embodiment of FIG. 19, wherein master station 32 uses data bus 42 in two consecutive runs. If there is no request issued by other bus masters to use data bus 42 when master station 32 uses the data bus 42 a second time, the master station 32 immediately acquires the right to use the data bus 42 without going through the arbitration procedure. This saves wasteful arbitration time.

According to the embodiment of FIG. 19, any given bus master is permitted to acquire the right to use the data bus 42 without going through the arbitration procedure using the arbitration bus, if in the case where the bus master uses the data bus again, no arbitration is carried out after the bus master finishes use of the data bus. Consequently, it is possible to save wasteful arbitration time and to improve system performance. The advantages enjoyed by the invention are remarkable in cases where a particular bus master uses the data bus frequently.

Advantageously, according to the invention, it is possible to carry out communication without being aware of the state of the dual redundant buses, examine the integrity of data also in areas other than the buses, and implement a communication system and a communication control method that ensures high speed, highly reliable communication.

The foregoing description is illustrative of the principles of the invention. Numerous modifications and extensions thereof would be apparent to the worker skilled in the art. All such modifications and extensions are to be construed to be within the spirit and scope of the invention.

What is claimed is:

1. In a communication system wherein a master station and a slave station are connected using two redundant buses and communication between said master station and said slave station is selectively controlled;

a processor for controlling said master station as a whole;

a first communication means for simultaneously sending out command frames having same content from said master station to both said two redundant buses, wherein said first communication means adds check bits to said command frames; and first procedure control means for performing a test of valid data transfer using said check bits on contents of two command frames received by said slave station through said two redundant buses, for verifying conformity between contents of said two command frames, and then, depending on results of verification, for selecting a process from among the following processes:

a process wherein, if command frames judged to be normal by means of said check bits are received through both redundant buses and contents of received two command frames match, said first procedure control means upon instruction by a command returns, normal end responses having same content to both redundant buses;

a process wherein, if a command frame judged to be normal by means of said check bits is received through either said redundant bus, said first procedure control means upon instruction by a command returns a normal end response to only a redundant bus that received a command frames;

a process wherein, if command frames judged to be normal by means of said check bits are received through both redundant buses but contents of received two command frames do not match, said first procedure control means ignores commands and returns abnormal end responses having same content to both redundant buses; and a process wherein, if a command frame judged to be normal by means for said check bits is not received through either of the redundant buses, said first procedure control means does not return any response to either of said two redundant buses.

2. The system of claim 1, further comprising:

a second communication means for sending out response frames from a slave station to two redundant buses, wherein said second communication means adds check bits to said response frames and a second procedure control means for monitoring responses from said slave station and then for selecting a next process from among a plurality of processes listed as follows, depending on results of monitoring:

a process wherein, if response frames judged to be normal by means of said check bits are received through both redundant buses and are normal end responses whose contents match, said second procedure control means informs said processor of normal end of access;

a process wherein, if a response frame judged to be normal by means of said check bits is received through either of said redundant buses and content of received response frame is a normal end response, said second procedure control means informs said processor of normal end of access;

a process wherein, if response frames judged to be normal by means of said check bits are received through both said redundant buses and contents of received two response frames do not match, or if response frames judged to be normal by means of said cheek bits are received through both redundant buses and are abnormal end responses whose contents match, or if a response frame judged to be normal by means of said check bits is received through either of said redundant buses and content of received response frame is an abnormal end response, then said second procedure control means informs said processor of abnormal end of access; and a process wherein, if a response frame judged to be normal by means of said check bits is not received through either of said redundant buses, said second procedure control means informs said processor of abnormal end of access.

3. The system of claim 2, further comprising an annunciator for informing said processor of which one of said plurality of processes was being operated on to provide access to said slave station before said process ended.

4. A communication control method wherein a master station and a slave station are connected using two redundant buses and communication between said master station and said slave station is controlled; wherein command frames having same content are simultaneously sent out from said master station to both said redundant buses, check bite are added to said command framed, said command frames sent through said two redundant buses are received by said slave station, a test of valid data transfer is performed using said cehck bits to verify whether contents of received two command frames match, and depending on results of verification, a process is selected from among the following plurality of processes:

a process wherein, if command frames judged to be normal by means of said check bits are received through both redundant buses and contents of received two command frames match, said method acts to instruct by command and returns normal end responses having same content to both said redundant buses;

a process wherein, if a command frame judged to be normal by means of said check bits is received through either redundant bus, said method acts as instructed by command and returns a normal end response to only a redundant bus that received a command frame;

a process wherein, if command frames judged to be normal by means of said check bite are received through both redundant buses but contents of received two command frames do not match, said method ignores commands and returns abnormal end response having same content to both said redundant buses; and a process wherein, if a command frame judged to be normal by means of said check bits is not received through either of said redundant buses, said method does not return any response to either of said redundant buses.

5. The method of claim 4, wherein response frames to which check bits are added are sent out from said slave station to said two redundant buses and said master station monitors response from said slave station, and then selects a process from the listed following processes depending on results of monitoring:

a process wherein, if response frames judged to be normal by means of said check bits are received through both buses and are normal end responses whose contents match, said method informs said master station of normal end of access;

a process wherein, if a response frame judged to be normal by means of check hits is received through either of said redundant buses is a normal end response, said method informs said master station of normal end of access;

a process wherein, if response frames judged to be normal by means of said check bits are received through both redundant buses and contents of received two response frames do not match, or if response frames judged to be normal by means at said check bits are received through both redundant buses are abnormal end responses having contents that match, or if a response frame judged to be normal by means of said check bits is received through either of said redundant buses and content of received response frame is an abnormal response, then said method informs said master station of abnormal end of access; and a process wherein, if a response frame judged to be normal by means of said cheek bits is not received through either of said redundant buses, said method informs said master station at abnormal end of access.

6. The method of claim 5, comprisng the step of informing said master station of which one of said plurality of processes is accessed by said slave station before said one process ended.

* * * * *